Nov. 11, 1930.  E. B. CARNS  1,781,159
WING FOR AIRCRAFT
Filed May 18, 1927  3 Sheets-Sheet 1

Inventor
Edmund B. Carns.
By his Attorneys.
Hoguet & Neary.

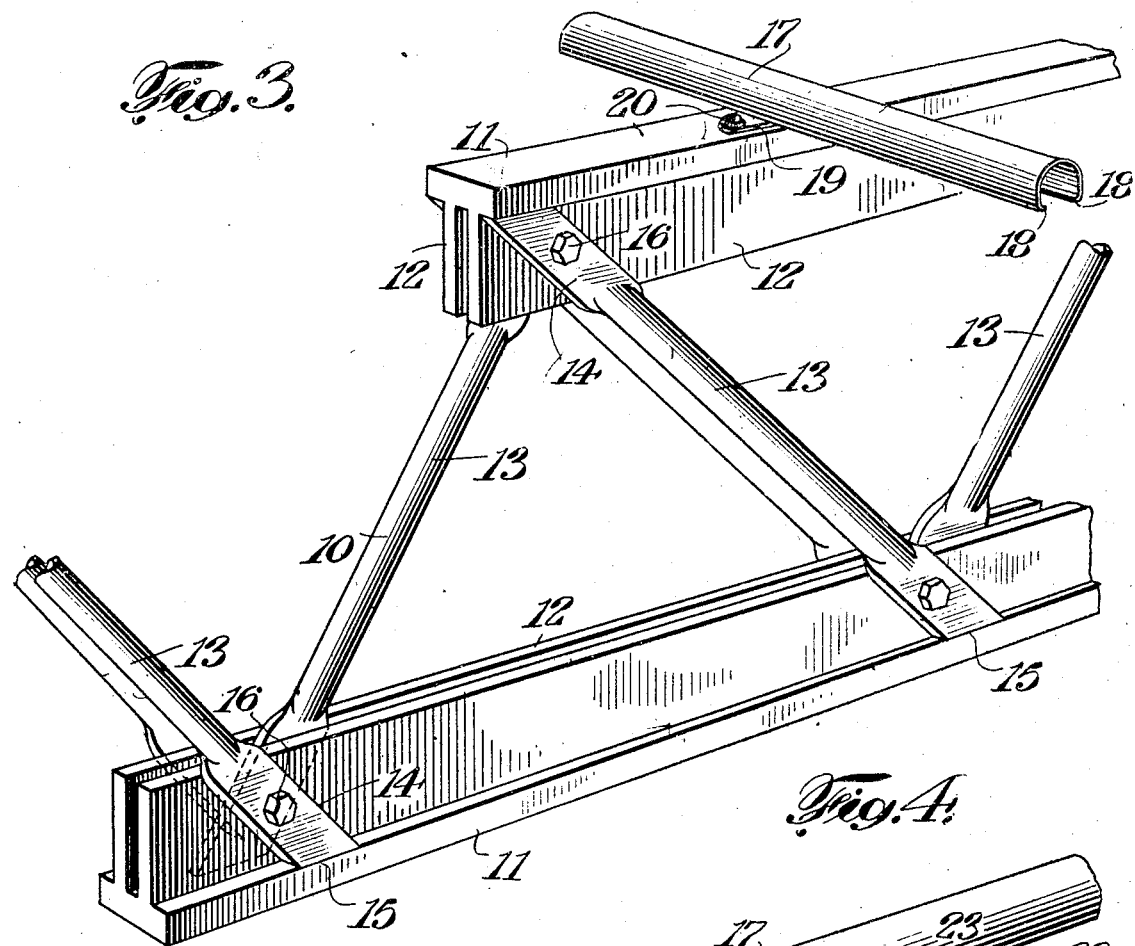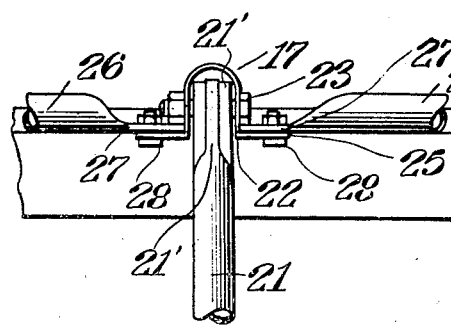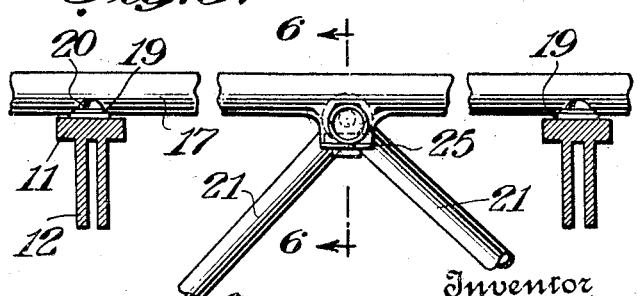

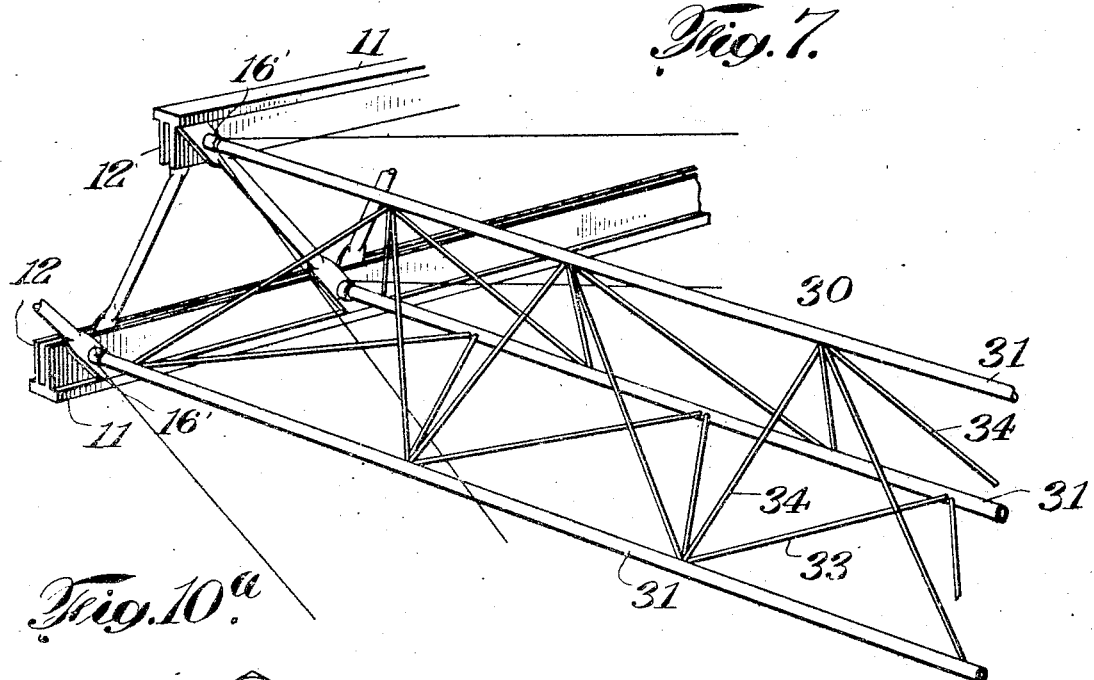
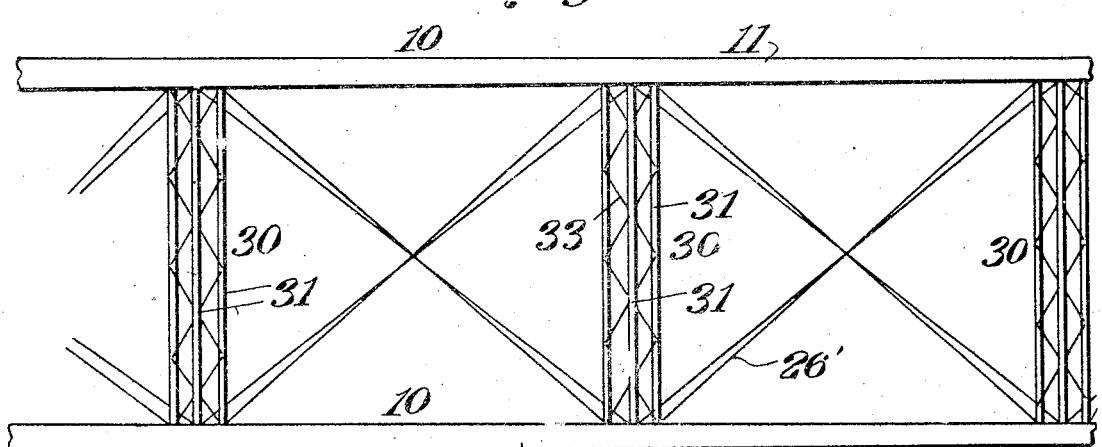
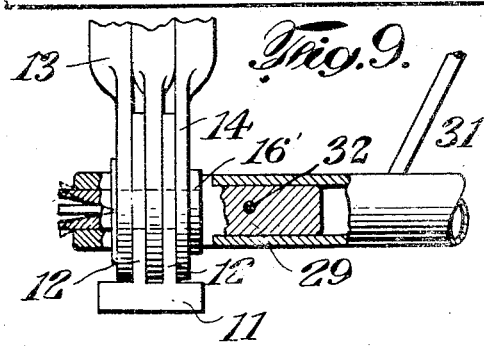
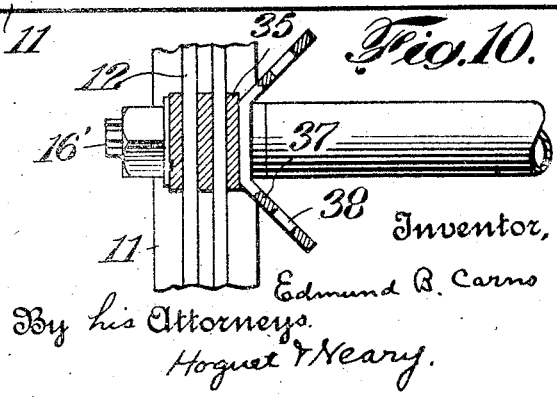

Patented Nov. 11, 1930

1,781,159

UNITED STATES PATENT OFFICE

EDMUND B. CARNS, OF NEW YORK, N. Y., ASSIGNOR TO CAIRNS DEVELOPMENT COMPANY, OF WILMINGTON, DELAWARE, A CORPORATION OF DELAWARE

WING FOR AIRCRAFT

Application filed May 18, 1927. Serial No. 192,244.

My invention relates to improvements in wings for air craft and the object of my invention is to produce a light, strong and serviceable wing which can be economically built and which is of such a structure that it can be easily made in a commercial way. That is to say, the parts of the wing are composed of standard materials which can be bought in the open market and easily shaped to adapt themselves to my improved wing constructions.

My invention is further intended to produce a wing which can be made of light materials and to shape and dispose these materials so that the wing parts can be easily assembled and to the end that the assembled parts will properly brace the wing. The invention is further intended to produce a wing along the lines indicated which can be very readily made of the conventional or any preferred shape or contour.

Reference is to be had to the accompanying drawings forming a part of this specification, in which similar reference characters indicate corresponding parts in all the views.

Figure 3 is an enlarged detail perspective showing the connection of the spar members and a rib.

Figure 4 is a broken detail perspective of a rib and its connections.

Figure 5 is a broken side elevation of a rib and its connections.

Figure 6 is a cross section on line 6—6 of Figure 5.

Figure 7 is a broken perspective view showing a preferred form of bridging or bracing between the spars.

Figure 8 is a broken plan view of a bay between two spars showing the bridging.

Figure 9 is a broken detail partly in section showing a means of connecting the bridge work or bracing between the spars and Figure 10 is a sectional plan of the structure shown in Figure 9.

Figure 1:
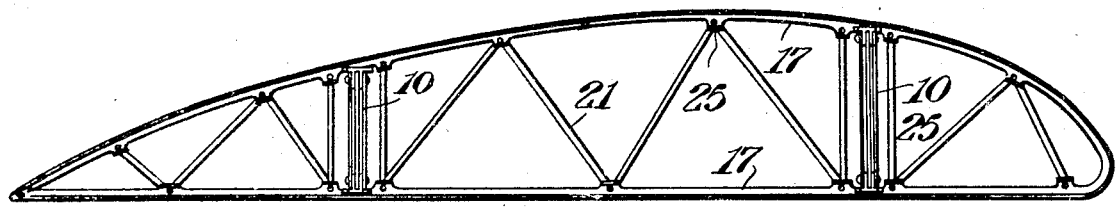
Figure 1 is a cross section of the wing embodying my invention.

Figure 10ª is a detail.

The wing is provided with spars 10 which can be of any desired number and which as usual run from one end of the wing to the other. These spars are made of separable parts which, however, can be easily assembled to form complete spars. Each spar has at the top and bottom similar T's of metal comprising each a flange member 11 and a double web 12 with parts of the web spaced as shown in Figure 3. There can be more than two web members 12 if desired. In arranging these parts into a spar, the flange of the upper spar member will be uppermost while the lower spar member will be reversed as shown in Figure 3. These upper and lower members are united and rigidly spaced by struts 13 which are preferably though not necessarily of tubular metal with the end portions flattened as at 14 so as to lie snug against the part of the spar members against which the struts fit. The struts are diagonally arranged as the drawings show and at the ends each strut is cut off at an angle as shown at 15 so that the end will lie flat against a flange 11 of a spar member while the sides will lie flat against the web 12 of said member. The struts are disposed singly and in pairs as shown in Figure 3. That is to say, a pair of struts will be connected to the outer sides of the webs 12 while a single strut will extend at another angle as the drawing clearly shows and its ends will enter between the web members 12 and between the ends of an adjacent pair of struts so that a single bolt 16 or equivalent fastening member can be passed through the end portions of the three converging struts and serve to fasten all three securely in place. This makes a compact and strong arrangement and there is not very much strain on the bolt, by reason of the manner in which the end portions 15 of the struts abut with flange portions 11 of the spar members.

The spars taper from the center toward the ends and the flanges and webs of the T's which form a part of them should also be similarly tapered.

The spars are traversed by ribs 17 which are arranged on the outer sides, that is the upper and lower edges of the spars and these ribs are shaped to the desired contour of the wing. Each rib is in the form of an inverted U-shape channel and has its edges inturned as at 18 so that these flanges form a seat to rest snugly against the spar members and they also act to give great additional rigidity to the ribs.

Where the ribs contact with the spar members they are provided with flanges 19 which fit snugly against the spars and the flanges and ribs may be fastened by screws 20 or they may be riveted, welded or otherwise secured.

The ribs 17 are also braced by struts 21 which are arranged cantilever fashion as in Figure 1 and are of the same construction as the struts 13 already described. The flattened ends 21' of these struts enter the ribs 17 which they connect and they are fastened in place by bolts 23 or the like. To the rib edges are flanges 22 which are turned outwards at right angles as at 25 so that they may form a convenient connection with the drift rods or longitudinal braces 26 which extend from rib to rib as in Figure 2 and like the struts 13 and 21 are preferably tubular in cross section with flattened ends 27 adapted to lie on the flanges 25 as in Figure 6 to which they may be fastened by bolts 28 or by equivalent fastening means.

I prefer to brace the wing between the spars by the bridge work or bracing shown in Figures 7 to 10. As here illustrated, the braces comprise a triangular bridge work 30 comprising a plurality of cross rods and individual braces which comprise a single unit. Each of these units consist of spaced rods 31 which are preferably tubular and to provide for conveniently connecting them, the bolts 16 which have been heretofore referred to, can enter the socketed ends of the rods 31 as shown at 29 in Figure 9 and it will be noted that these tubular rods 31 are disposed so that the upper rod will align with a bolt 16' on the upper spar member while the two lower rods 31 will be aligned with spaced bolts 16' on the lower spar member. The rods 31 are connected by diagonal braces 33 and 34 to give the bridge or structure as a whole the desired stiffness and still retain a skeleton formation which makes it light. The tubular rods 31 where they connect with the bolts 16 can be fastened by screw bolts 32 or the like. In connection with this structure I also prefer to attach drift rods 26' so that they will extend diagonally between the spar members as shown in Figure 8. A convenient way of effecting the attachment is to provide clips 35 of angular shape which are fastened at their centers on bolts 16' and which have arms 37 extending in line with the drift rods 26' and the arms can be provided with eyes 38 to facilitate their attachment to the arms.

Figure 2:
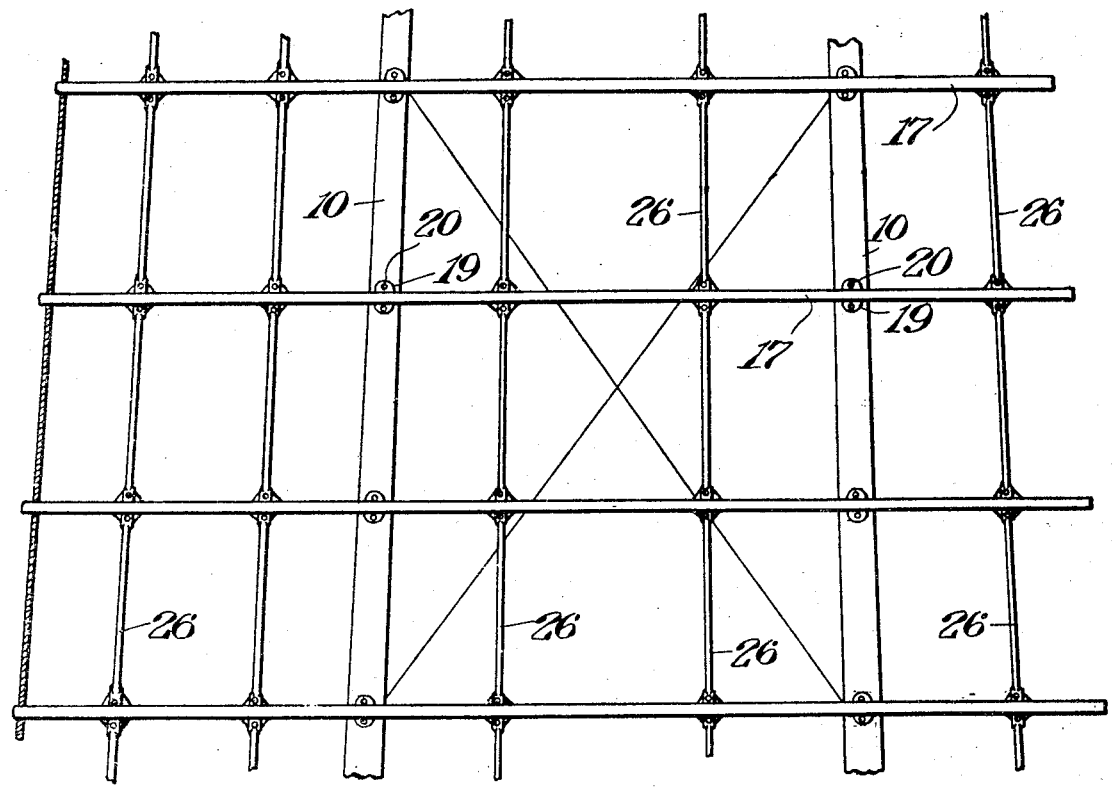
Figure 2 is a broken plan of the wing frame.

While a lighter type of wing can be made without the bridging 30 as shown in Figures 1 and 2, still if the wing is to be of substantial size, I prefer to use the bridge work bracing as it greatly stiffens the wing.

It will be noted that the parts from which my improved structure is made are all substantially standard or are all of such a character as to be readily made by well understood commercial methods and when the various parts are shaped as described, the whole wing structure can be very quickly assembled and will be light and strong as it is braced in all directions as described. This makes it possible to produce the essential parts in a quantative way so that there will be duplicates and applicable to any wing of any given dimensions and thus the wings can be economically produced in a quantative way.

I claim:

1. A wing for air craft having spars each comprising upper and lower T's with split webs opening inwardly, and diagonally disposed struts connecting the T's, the struts being disposed alternately in pairs and singly with the single strut entering and fitting snugly between the web members of the T's and with the other struts straddling said web members.

2. A wing for air craft having spars each with upper and lower T members having split webs, diagonally disposed struts connecting the T's with alternate strut members arranged in pairs and singly with the single strut entering between the webs of the T's and the strut pairs straddling the web, and a single fastening element securing the single strut and the pairs of struts to the webs.

3. A wing for air craft having spars each composed of upper and lower T members with split webs, and diagonally disposed struts connecting the said T members, the struts being arranged alternately in pairs and singly with the strut ends fitting against the flanges of the T's and against the sides of the webs the pairs of struts straddling the T webs and the single struts entering between the T's, and single fastening elements extending through the converging strut ends and the connecting T webs.

4. In a wing for air craft, the combination with the spars, of skeleton bridge work connecting the spars, each connecting bridge work comprising a triangular structure having rods at the angles, and diagonal braces connecting the several rods.

In testimony whereof, I have signed my name to this specification this 13th day of May, 1927.

EDMUND B. CARNS.